United States Patent
Chun

(10) Patent No.: US 10,660,022 B2
(45) Date of Patent: May 19, 2020

(54) METHOD AND USER EQUIPMENT FOR REQUESTING CONNECTION TO NETWORK

(71) Applicant: LG ELECTRONICS INC., Seoul (KR)

(72) Inventor: Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/079,046

(22) PCT Filed: Feb. 24, 2017

(86) PCT No.: PCT/KR2017/002065
§ 371 (c)(1),
(2) Date: Aug. 22, 2018

(87) PCT Pub. No.: WO2017/146523
PCT Pub. Date: Aug. 31, 2017

(65) Prior Publication Data
US 2019/0028962 A1 Jan. 24, 2019

Related U.S. Application Data

(60) Provisional application No. 62/300,085, filed on Feb. 26, 2016, provisional application No. 62/347,051, (Continued)

(51) Int. Cl.
*H04B 7/00* (2006.01)
*H04W 48/14* (2009.01)
(Continued)

(52) U.S. Cl.
CPC ............ *H04W 48/14* (2013.01); *H04W 8/24* (2013.01); *H04W 48/02* (2013.01); *H04W 76/10* (2018.02); *H04W 88/04* (2013.01)

(58) Field of Classification Search
CPC ............ H04W 72/02; H04W 72/0406; H04W 72/044; H04W 72/048
(Continued)

(56) References Cited

U.S. PATENT DOCUMENTS 9,491,739 B2 * 11/2016 Maheshwari ......... H04W 72/04
9,532,357 B2 * 12/2016 Speight .................. H04W 4/70
(Continued)

FOREIGN PATENT DOCUMENTS

WO 2010150779 12/2010
WO 2012091418 7/2012
(Continued)

OTHER PUBLICATIONS

PCT International Application No. PCT/KR2017/002065, Written Opinion of the International Searching Authority dated Jun. 15, 2017, 13 pages.
(Continued)

*Primary Examiner* — Dmitry Levitan
(74) *Attorney, Agent, or Firm* — Lee Hong Degerman Kang & Waimey

(57) ABSTRACT

In a wireless communication system, a user equipment (relay UE) can request to connect to a network to transfer data to another user equipment (remote UE). Before requesting the connection, the relay UE can perform access control for determining whether an access attempt to the network is allowed. The relay UE can perform the access control by using an access class of the remote UE.

14 Claims, 16 Drawing Sheets

Related U.S. Application Data filed on Jun. 7, 2016, provisional application No. 62/370,251, filed on Aug. 3, 2016.

(51) Int. Cl.
*H04W 88/04* (2009.01)
*H04W 76/10* (2018.01)
*H04W 8/24* (2009.01)
*H04W 48/02* (2009.01)

(58) Field of Classification Search
USPC .......................................... 370/310, 315, 328
See application file for complete search history.

(56) References Cited

U.S. PATENT DOCUMENTS

| | | | | |
|---|---|---|---|---|
| 10,164,903 | B2* | 12/2018 | Guo | H04W 4/60 |
| 10,187,810 | B1* | 1/2019 | Liu | H04W 28/10 |
| 10,194,304 | B2* | 1/2019 | Chen | H04W 8/005 |
| 2014/0364079 | A1* | 12/2014 | DiFazio | H04W 88/04 |
| | | | | 455/404.1 |
| 2015/0249673 | A1* | 9/2015 | Niemoeller | H04W 12/08 |
| | | | | 726/4 |
| 2016/0100353 | A1* | 4/2016 | Gleixner | H04W 48/16 |
| | | | | 370/329 |
| 2018/0279195 | A1* | 9/2018 | Kim | H04W 36/22 |
| 2018/0352595 | A1* | 12/2018 | Feng | H04W 40/24 |
| 2019/0028962 | A1* | 1/2019 | Chun | H04W 76/20 |

FOREIGN PATENT DOCUMENTS

| | | |
|---|---|---|
| WO | 2012091420 | 7/2012 |
| WO | 2016024773 | 2/2016 |

OTHER PUBLICATIONS

Samsung, "eD2D relay: inter layer interaction regarding threshold checking", 3GPP TSG RAN WG2 Meeting #93, R2-161222, Feb. 2016, 8 pages.

Feng, Junyi, "Device-to-Device Communications in LTE-Advanced Network", Networking and Internet Architecture, Telecom Bretagne, Apr. 2014, pp. 1-96, 116 pages.

Lte Advance Pro, 3GPP TS 22.011 V13.4.0 (Dec. 2015), 28 pages.

European patent application No. 17756861.5, European search report dated Nov. 6, 2019, 5 pages.

* cited by examiner (a) UE-P-GW user plane with E-UTRAN (b) Control Plane UE-MME (a) UE-1 and UE-2 campin on different eNBs (b) UE-1 and UE-2 camping on same eNB

METHOD AND USER EQUIPMENT FOR REQUESTING CONNECTION TO NETWORK

CROSS-REFERENCE TO RELATED APPLICATIONS

This application is the National Stage filing under 35 U.S.C. 371 of International Application No. PCT/KR2017/002065, filed on Feb. 24, 2017, which claims the benefit of U.S. Provisional Application No. 62/300,085, filed on Feb. 26, 2016, 62/347,051, filed on Jun. 7, 2016 and 62/370,251, filed on Aug. 3, 2016, the contents of which are all hereby incorporated by reference herein in their entirety.

TECHNICAL FIELD

The present invention relates to a wireless communication system and, more particularly, to a method for requesting a connection to a network and a user equipment.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

When a UE desires to access a network through another UE in a wireless communication system, a method for efficiently controlling the access is required.

The technical objects that can be achieved through the present invention are not limited to what has been particularly described hereinabove and other technical objects not described herein will be more clearly understood by persons skilled in the art from the following detailed description.

Technical Solution

In a wireless communication system, a user equipment (relay UE) can request a connection to a network to transfer data to another user equipment (remote UE). Before requesting the connection, the relay UE can perform access control for determining whether an access attempt to the network is allowed. The relay UE can perform the access control by using an access class of the remote UE.

In one aspect of the present invention, a method for requesting a connection to a network from a user equipment (UE) (relay UE) in a wireless communication system is provided. The method comprises: receiving, from another UE (remote UE), a transfer request for data of the remote UE; performing a relay UE access control based on an access class of the remote UE for determining whether an access attempt to the network is allowed; and transmitting, to the network, a connection request if the access attempt to the network is allowed.

In another aspect of the present invention, a user equipment (UE) (relay UE) for requesting a connection to a network in a wireless communication system is provided. The UE comprises a radio frequency (RF) unit; and a processor configured to control the RF unit. The processor may be configured to: receive, from another UE (remote UE), a transfer request for data of the remote UE; perform a relay UE access control based on an access class of the remote UE for determining whether an access attempt to the network is allowed; and transmit a connection request to the network if the access attempt to the network is allowed.

In each aspect of the present invention, the connection request may be a radio resource control (RRC) connection request.

In each aspect of the present invention, the relay UE may receive information on the access class of the remote UE from the remote UE.

In each aspect of the present invention, the relay UE access control may be performed if the remote UE has not performed a remote UE access control. The connection request may be transmitted to the network without the relay UE access control if the remote UE determines, by performing the remote UE access control, that the access attempt to the network is allowed by performing the remote UE access control.

In each aspect of the present invention, the relay UE may receive information indicating whether the remote UE access control is performed from the remote UE.

In each aspect of the present invention, the relay UE may receive information indicating a result of the remote UE control access from the remote UE.

In each aspect of the present invention, the relay UE may receive access control related information from the network. The relay UE may transfer the access control related information to the remote UE.

In each aspect of the present invention, the relay UE may transfer the data of the remote UE to the network if connection with the network is established.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, when a UE desires to access a network through another UE in a wireless communication system, network access through the UE or another UE may be controlled efficiently.

According to the present invention, uplink/downlink signals can be efficiently transmitted/received. Therefore, overall throughput of a radio communication system can be improved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
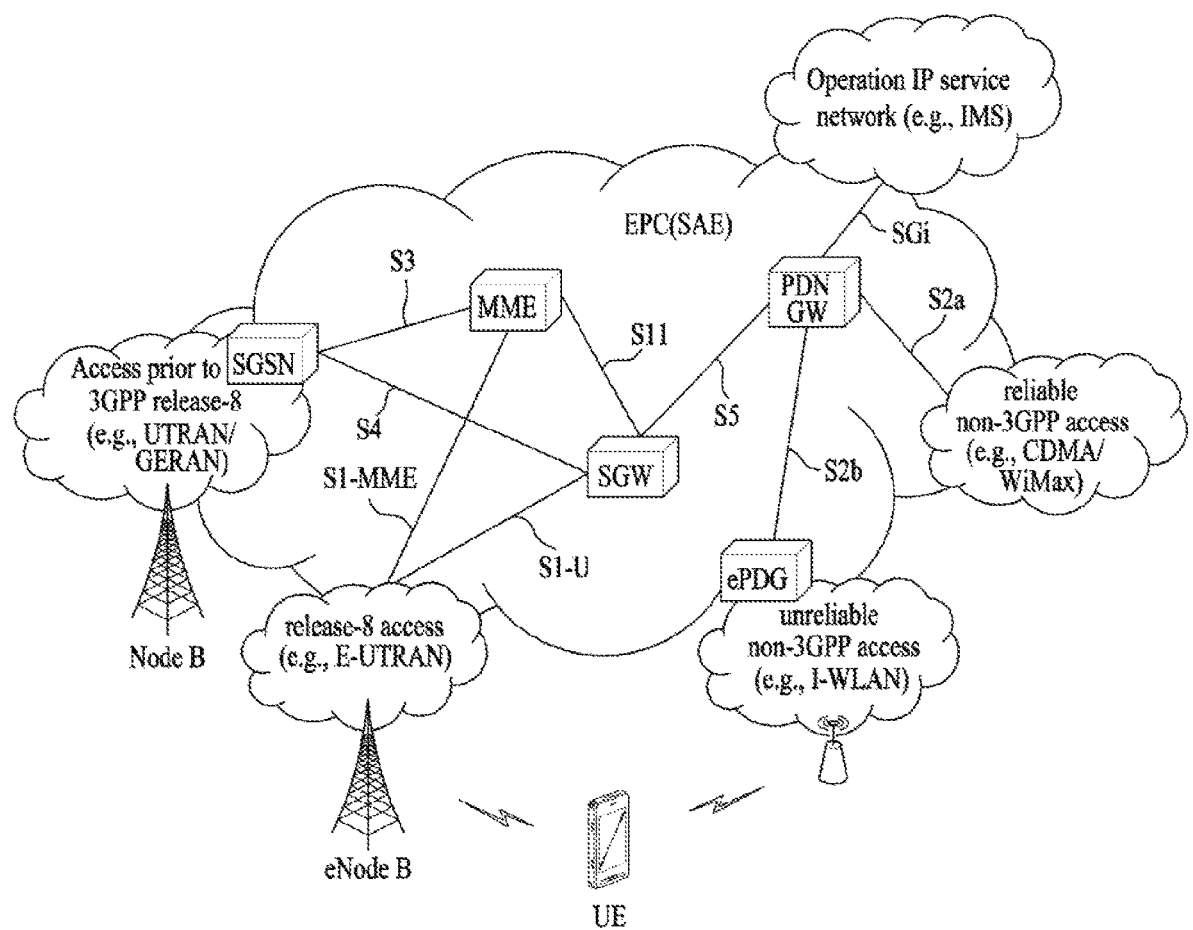
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, 3GPP TS 24.301, 3GPP TS 23.228, 3GPP TS 29.228, 3GPP TS 23.218, 3GPP TS 22.011, 3GPP TS 36.413 and 3GPP TS 23.303 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention. The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

Proximity Services (or ProSe Service or Proximity based Service): a service that enables discovery between physically proximate devices, mutual direct communication through a base station, or communication through the third party device. Here, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a direct communication path.

ProSe Communication path: communication path supporting ProSe Communication. The ProSe E-UTRA Communication path could be established between the ProSe-enabled UEs using E-UTRA, or via local eNB (s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, which uses a common communication path, between more than two ProSe-enabled UEs in proximity.

ProSe UE-to-Network Relay: ProSe-enabled Public Safety UE that acts as a communication relay between a ProSe-enabled UE and the ProSe-enabled network using E-UTRA.

Remote UE: This is a Prose-enabled UE connected to EPC network, i.e. perform communication with a PDN, through Prose UE-to-Network Relay without service from E-UTRAN.

ProSe UE-to-UE relay: a form of relay in which a ProSe-enabled UE acts as a ProSe Communication relay between two other ProSe-enabled UEs.

ProSe-enabled Network: a network that supports ProSe Discovery, ProSe Communication and/or ProSe-assisted WLAN direct communication. Hereinafter, the ProSe-enabled network may simply be referred to as a network.

ProSe-enabled UE: a UE that supports ProSe Discovery, ProSe Communication and/or ProSe-assisted WLAN direct communication. Hereinafter, ProSe-enabled UE may simply be referred to as a UE.

Model A: involves one UE announcing "I am here". This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

Model B: involves one UE asking "who is there" and/or "are you there". This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

Proximity: proximity is determined when given proximity criteria are fulfilled.

User service description (USD): in the USD (see 3GPP TS 26.346), the application/service layer provides for each service the TMGI (Temporary Mobile Group Identity), the session start and end time, the frequencies and the MBMS service area identities (MBMS SAIs, see definition in section 15.3 of 3GPP TS 23.003) belonging to the MBMS service area (see definition in 3GPP TS 23.246).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for |

TABLE 1-continued

| Reference Point | Description |
|---|---|
|  | inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
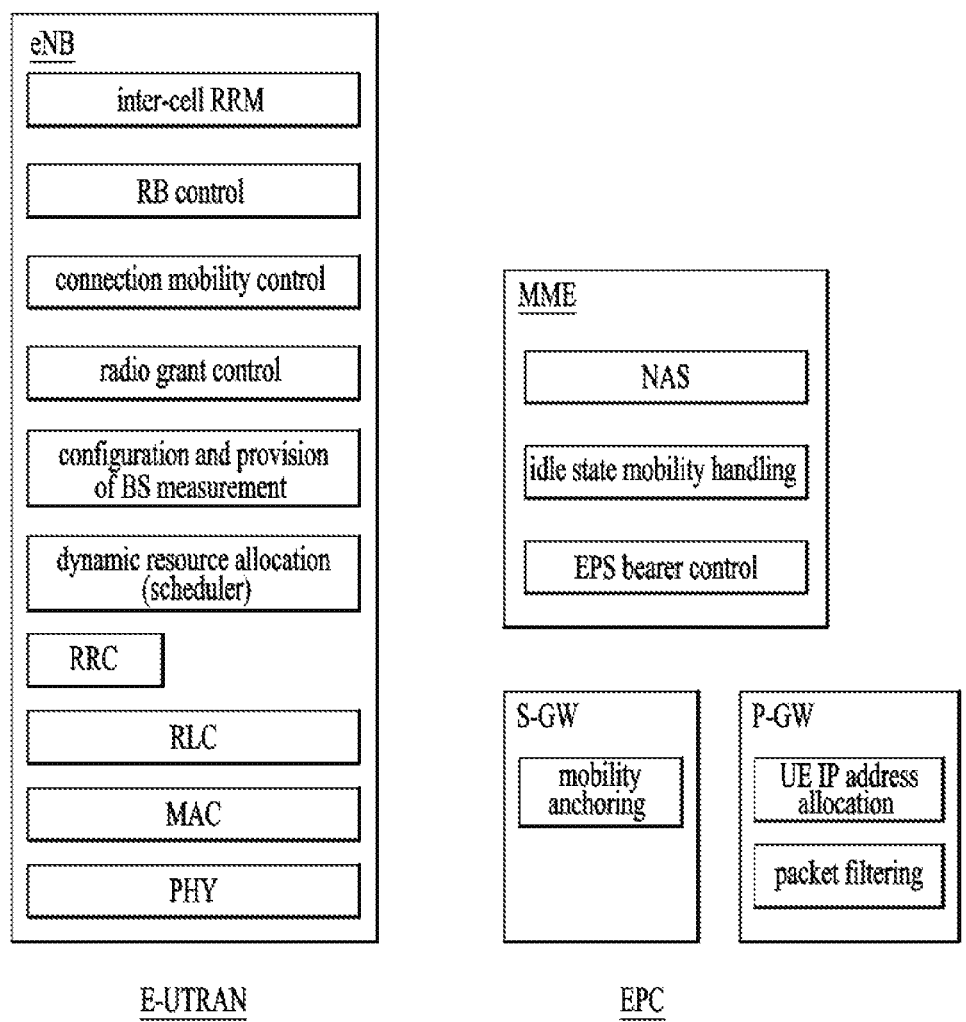
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
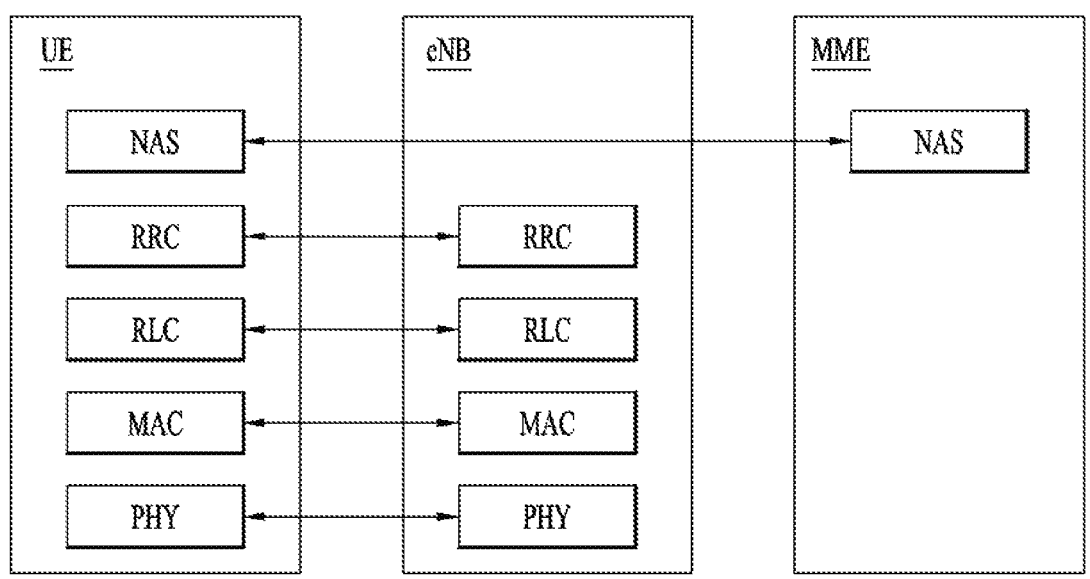
FIG. 3 is a diagram exemplarily illustrating the structure of a radio interface protocol in a control plane.
Figure 4:
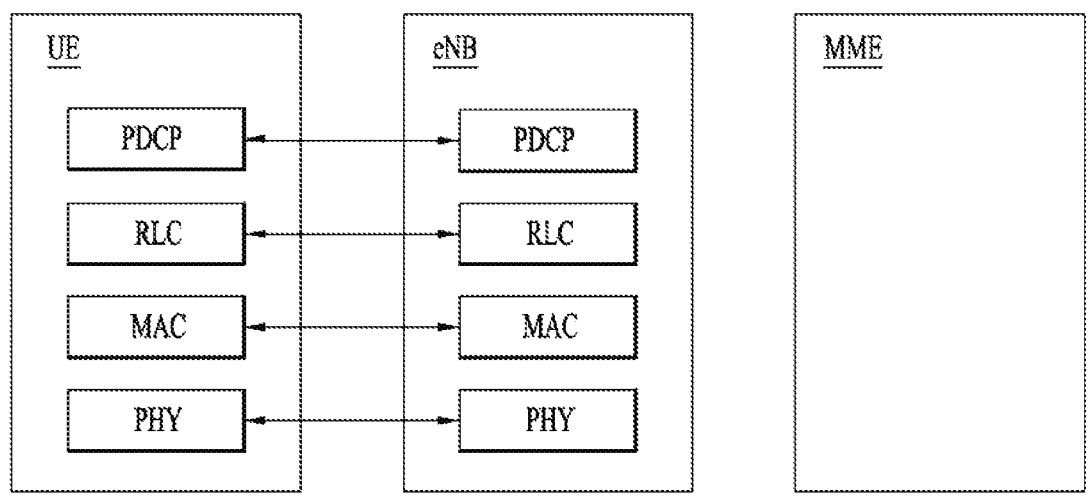
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish an RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is assigned from the network during initial access to a specific Packet Data Network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
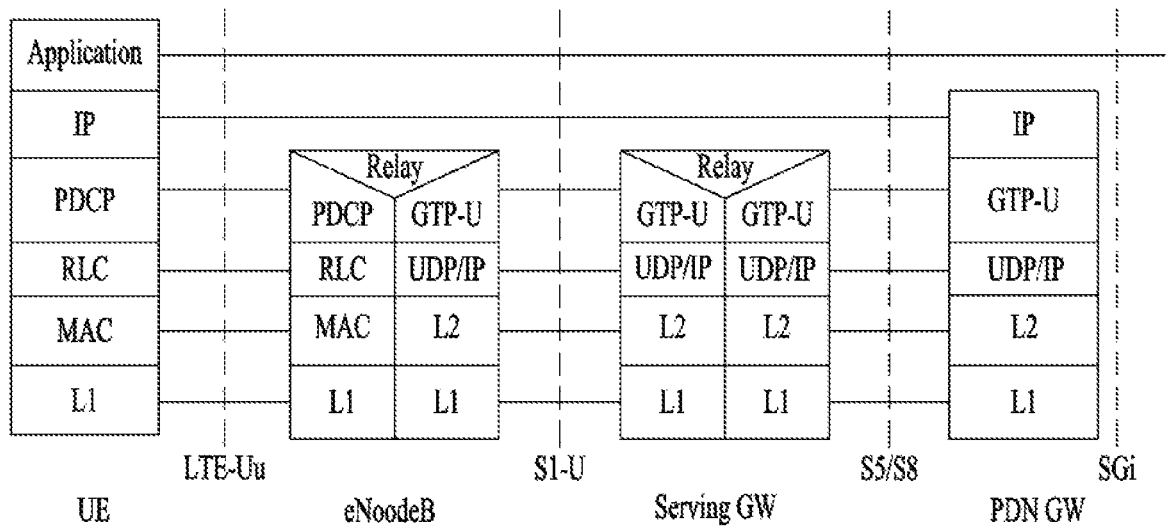
FIG. 5 is a diagram illustrating LTE (Long Term Evolution) protocol stacks for a user plane and a control plane.
Figure 5:
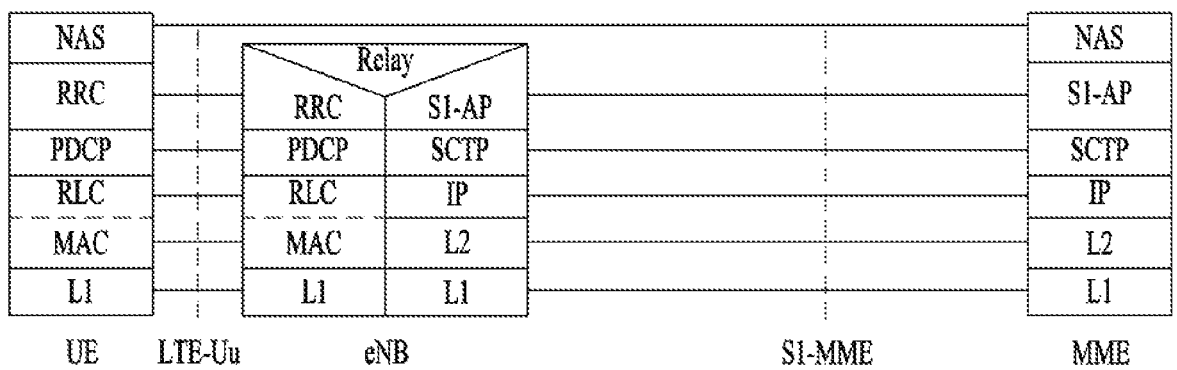

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME- SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
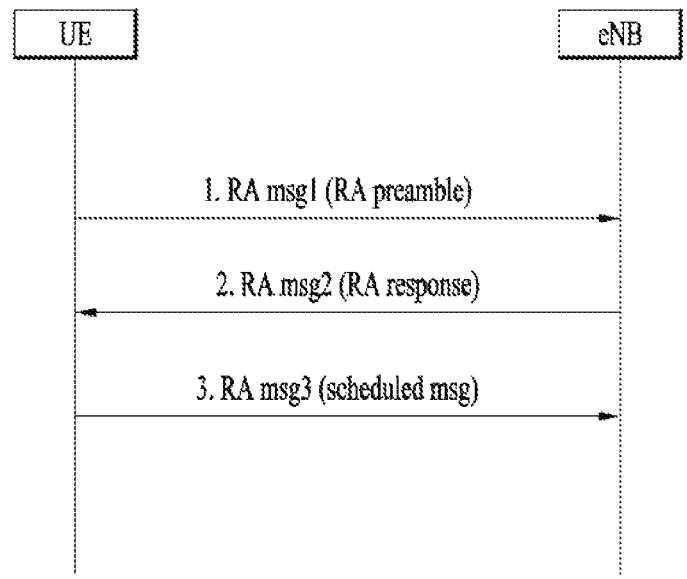
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
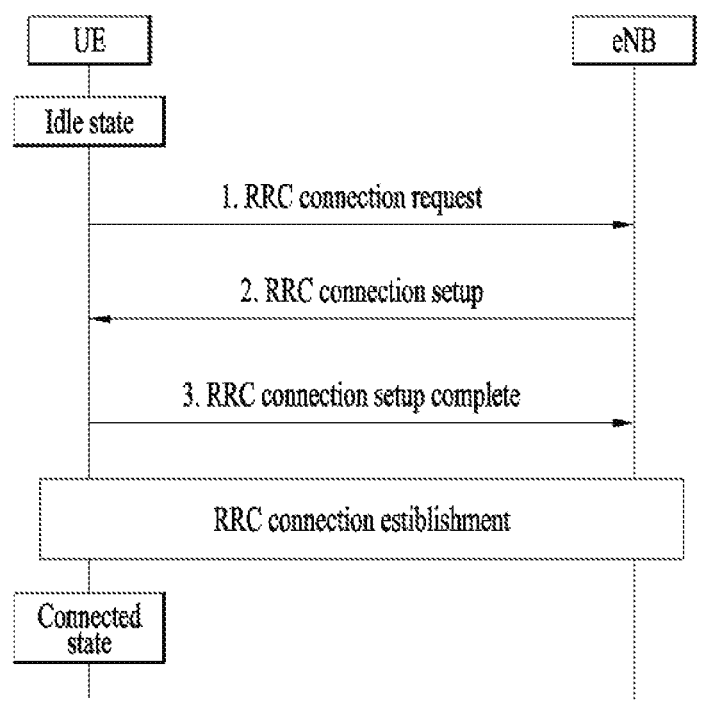
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

A ProSe service means a service that enables discovery and mutual direct communication between physically proximate devices or communication through a third party device.

Figure 8:
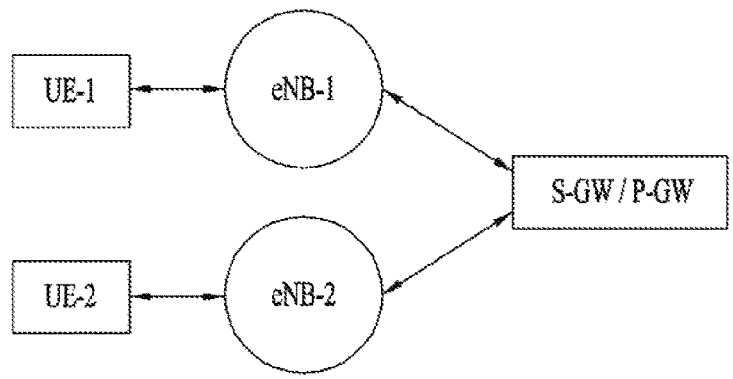
FIG. 8 illustrates a default path (that is, default data path) through which two UEs perform communication in an EPS.

FIG. 8 illustrates a default path (that is, default data path) through which two UEs perform communication in an EPS.

This default path passes through an eNB and a core network (e.g., EPC), which are managed by an operator. In the present invention, this path will be referred to as an infrastructure data path or EPC path. Also, communication through this infrastructure data path will be referred to as infrastructure communication.

Figure 9:
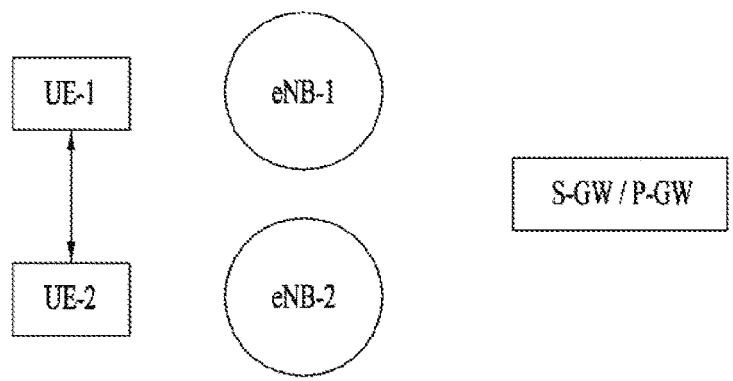
FIG. 9 illustrates a direct mode data path between two UEs based on ProSe.
Figure 9:
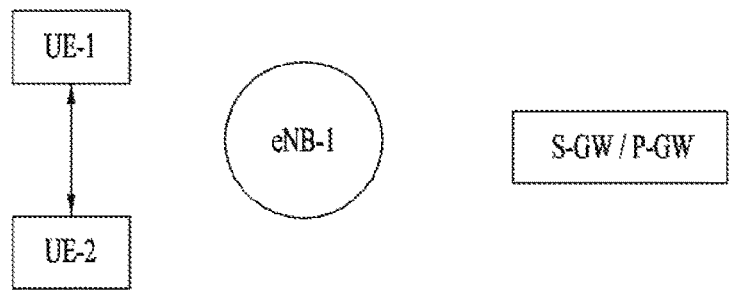

FIG. 9 illustrates a direct mode data path between two UEs based on ProSe. This direction mode data path does not pass through an eNB and a core network (e.g., EPC), which are managed by an operator. FIG. 9(a) illustrates that UE-1 and UE-2 transmit and receive data to and from each other through the direct mode data path while camping on their respective eNBs different from each other, and FIG. 9(b) illustrates that two UEs which are camping on the same eNB transmit and receive data to and from each other through the direct mode data path.

Figure 10:
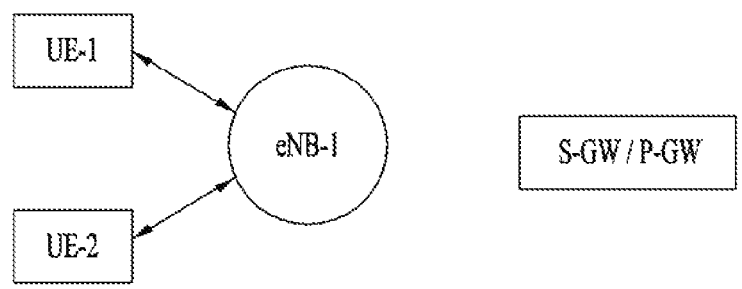
FIG. 10 illustrates a data path through eNB between two UEs based on ProSe, especially a locally-routed data path.

FIG. 10 illustrates a data path through eNB between two UEs based on ProSe, especially a locally-routed data path. This data path through eNB does not pass through a core network (e.g., EPC) managed by an operator.

In the present invention, the data path described in FIGS. 9 and 10 will be referred to as a direct data path, a data path for proximity service, or a proximity service based data path or proximity service communication path. Also, the direct data communication will be referred to as direct communication or proximity service communication or proximity service based communication.

Figure 11:
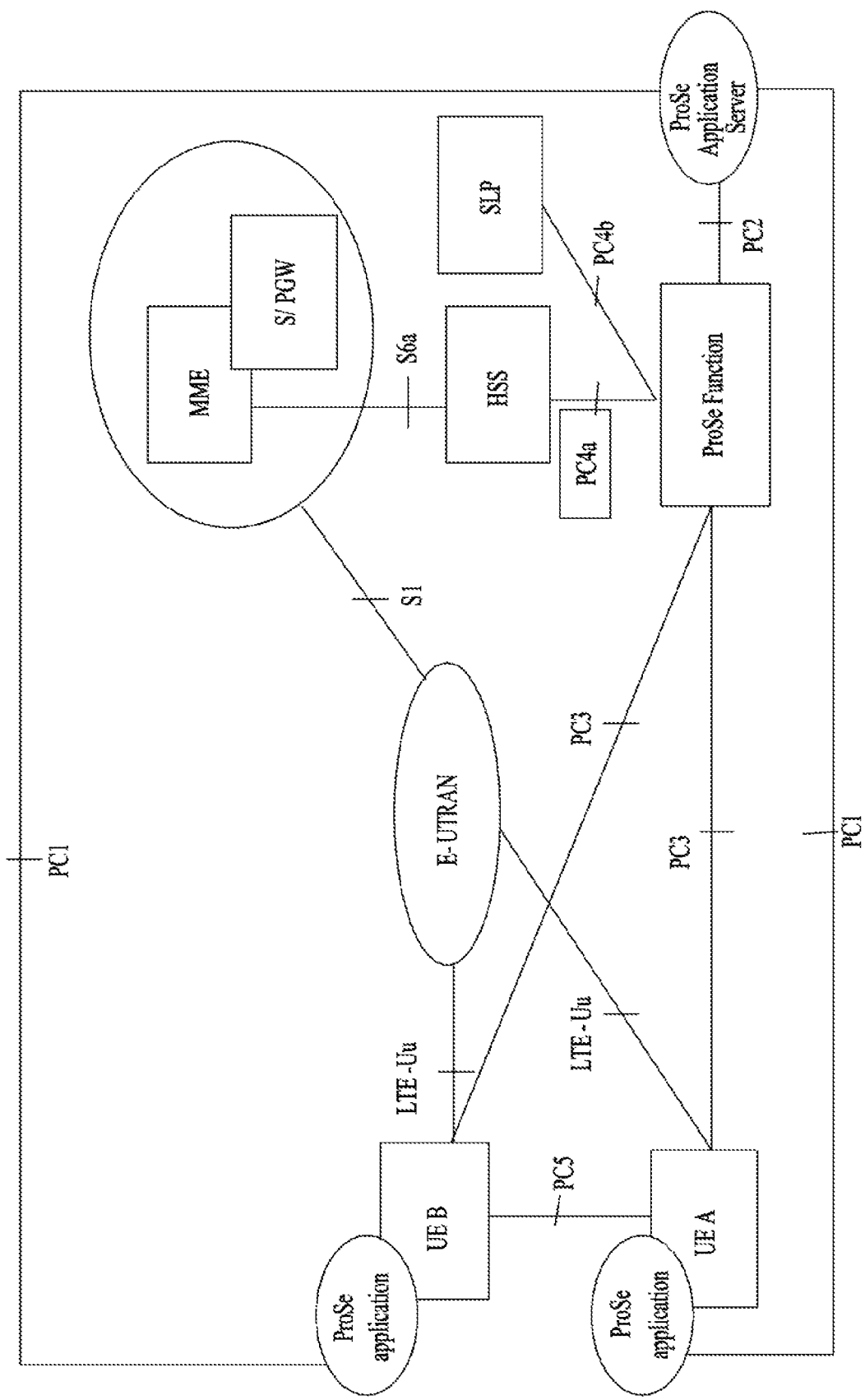
FIG. 11 illustrates a non-roaming reference architecture.

FIG. 11 illustrates a non-roaming reference architecture. In the architecture of FIG. 11, the EPC may perform an EPC-level ProSe discovery procedure of determining proximity of two UEs and notifying the UE of the determined result. This function of determining proximity of the two UEs for EPC-level ProSe discovery and notifying the UE of the determined result is a ProSe function.

The ProSe function may include retrieving and storing ProSe associated subscriber data and/or ProSe associated subscriber data from HSS, and performing EPC-level ProSe discovery and EPC assisted WLAN direct discovery and authentication and configuration for communication. Also, the ProSe function may be operated as a position service client that enables EPC-level discovery, and may provide the UE with information for assisting WLAN direct discovery and communication. The ProSe function includes handling EPC ProSe user IDs and application layer user ID, and exchanging a signal with a third party application server for application identifier mapping. For transmission of a proximity request, proximity alerts and position report, the ProSe function exchanges a signal with a signal of a ProSe function of other PLMNs. In addition, the ProSe function provides various parameters required for ProSe discovery and ProSe communication by the UE. Details of the ProSe function will be understood with reference to 3GPP TS 23.303.

Figure 12:
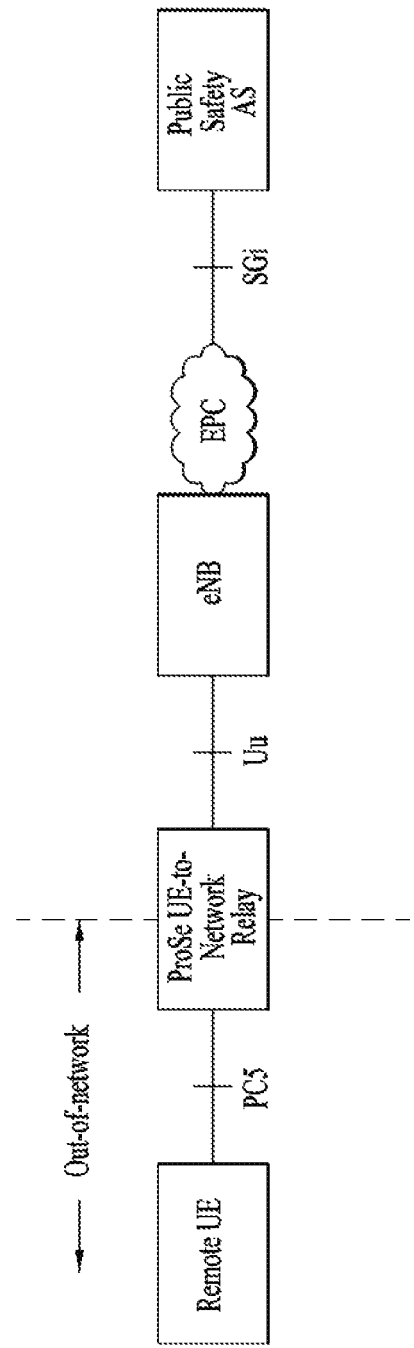
FIG. 12 illustrates communication through a ProSe UE-to-Network relay.

FIG. 12 illustrates communication through a ProSe UE-to-Network relay. A remote UE may perform communication with an application server (AS) or take part in group communication by receiving connectivity to an EPC through a UE-to-Network relay. As a result, a UE (e.g., remote UE of FIG. 12) which is out of network coverage (which is not served by E-UTRAN) may receive a connection service to a network through a ProSe UE-Network relay. In addition, if a UE which is inside network coverage uses a ProSe UE-to-Network relay, since the UE may perform communication by using only a power to reach a relay close thereto rather than an eNB which is distant, battery saving may be achieved.

Figure 13:
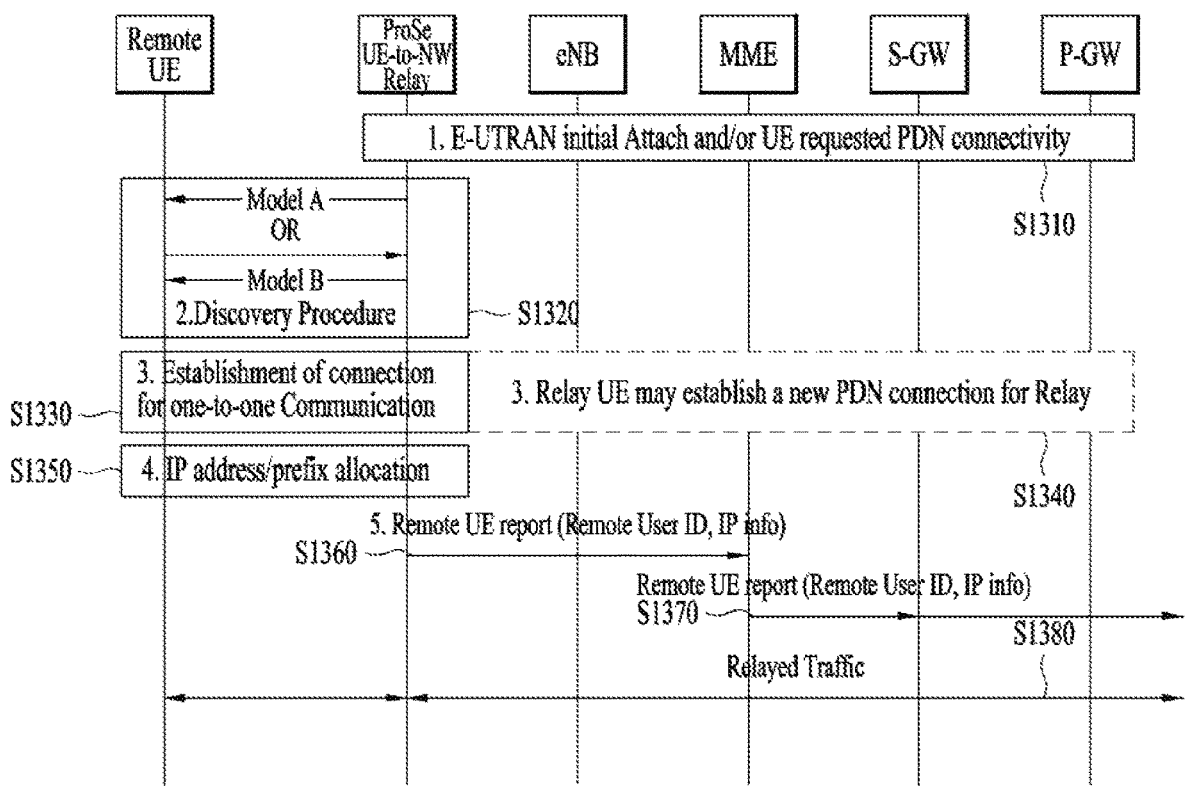
FIG. 13 illustrates a procedure of performing, by a remote UE which is not served by E-UTRAN, direct communication through a UE-to-Network relay.

FIG. 13 illustrates a procedure of performing direct communication through a UE-to-Network relay in a remote UE which is not served by E-UTRAN. A UE which may be operated through a ProSe-UE-to-Network relay may create a PDN connection to provide a relay traffic to the remote UE by accessing the network. The PDN connection which supports a UE-to-Network relay is only used to support a relay traffic to the remote UE.

First of all, the relay UE generates a PDN connection through initial access to the E-UTRAN (S1310), and acquires IPv6 prefix through a prefix delegation function in case of IPv6. Subsequently, the relay UE performs a discovery procedure with the UE according to the model A or B together with the remote UE (S1320). The remote UE selects a relay UE discovered by the discovery procedure and establishes one-to-one direct connection (S1330). If there is no PDN connection according to relay UE ID or additional PDN connection for relay operation is required, the relay UE initiates a new PDN connection procedure (S1340).

Subsequently, IPv6 prefix or IPv4 address is allocated to the remote UE (S1350), whereby an uplink/downlink relay operation is started. If IPv6 prefix is allocated, an IPv6 stateless address auto-configuration procedure is performed, which includes router solicitation signaling from the remote UE to the relay UE and router advertisement signaling from the relay UE to the remote UE. If the IPv6 address is allocated, an IPv4 address allocation using DHCPv4 is performed, which includes DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE).

Subsequently, the relay UE performs a remote UE reporting procedure of notifying an MME that the remote UE has been connected thereto (S1360). The MME notifies that a new remote UE has been connected by performing the remote UE reporting procedure for SGW and PGW (S1370). Then, the remote UE performs communication with the network through the relay UE (S1380). Details of the procedure of generating direct connection will be understood with reference to 3GPP TS 23.303.

Massive mobile data traffics have been generated in a mobile communication network for recent several years due to the development and fast market penetration of smartphones, and a communication traffic type has been remarkably changed from the legacy peer-to-peer communication to communication in which applications perform signal exchange autonomously. In a mobile communication system of high speed and high capacity, traffic congestion control is important in maintaining service stability in various statuses. Also, when a major disaster such as a big earthquake is generated, a mobile data traffic may be increased to an unexpected level and the network may be operated in error. Therefore, the mobile communication system needs a mechanism for preventing an unexpected high traffic from occurring before the unexpected high traffic is generated. To make sure of successful communication for emergency call and/or disaster board, a traffic congestion control mechanism is required to reduce a call which is not important/has a low priority to allow network resources for a call which is important/has a high priority to be available for many users if possible. In 3GPP, a series of traffic congestion mechanisms have been standardized to control mobile communication access for a network. One access control mechanism standardized as a part of 3G (UMTS) specifications and widely used in LTE is referred to as "Access Class (AC)" which is a control technology which uses priority identifier data stored in the UE.

Hereinafter, Application specific Congestion control for Data Communication (ACDC) for data communication which is one of access control mechanisms will be described.

ACDC is an access control mechanism by an operator, and is operated to allow the UE to allow or prevent a new access attempt by an application recognized by an operator. The network may prevent or reduce overload of an access network and/or a core network through ACDC. ACDC categories are ranked in accordance with a probability order which will be restricted. The operator allocates an application, which requires a minimum limitation only, to an ACDC category of the highest priority. As a result, an influence applied to an access attempt of the corresponding application may be reduced. If the operator determines ACDC to be applied to even a roaming UE, a configuration scheme of the aforementioned ACDC categories may be applied to the roaming UE in the same principle. Meanwhile, many applications which are not allocated to the ACDC categories exist in the UE. The UE handles the applications as those corresponding to the ACDC category of the lowest priority. If the operator needs to identify such uncategorized applications, the operator should not allocate the corresponding applications to the ACDC category of the lowest priority.

Requirements related to ACDC will be described. ACDC is applied to both UTRAN and E-UTRAN, and is also applied to a UE which is not a member of one or more of 11 to 15 access classes. A home network should configure at least four ACDC categories in the UE, wherein each ACDC category is related to an application recognized by the operator. The ACDC categories are ranked in accordance with a probability order which will be restricted. An HPLMN operator is responsible for providing ACDC categories to the UE. A serving network should broadcast control information (for example, barring rate) per ACDC category within one or more regions of a RAN, and should also broadcast whether the roaming UE is a target of ACDC control. The UE may control whether to allow an access attempt of a specific application in accordance with control information broadcast and ACDC category configuration in the UE. The serving network should indicate ACDC simultaneously with another type access control mechanism. For example, if ACDC and an Access Class Barring (ACB) control mechanism are indicated, ACDC is first applied prior to ACB. In the case that a plurality of core networks share the same access network, the access network should be able to apply ACDC for different core networks. To attenuate congestion in a shared RAN, a barring rate should equally be configured for all operators.

The aforementioned ACDC mechanism is applied to the case that the UE attempts establishment of an RRC connection, and is not applied to the case the UE is already in RRC connected mode. That is, if the UE in RRC idle mode has data to be transmitted, the UE identifies whether an application, which has generated data, is barred from establishing an RRC connection. However, after the UE transitions to an RRC connected mode for any reason, the UE does not identify whether data from a specific application are barred. A data path does not exist between the UE in RRC connected mode and the network. If data are received from the application, the UE may easily determine whether to establish an RRC connection. On the other hand, one or more data paths exist between the UE in the RRC connected mode and the network. Therefore, a barring mechanism which uses a control of RRC connection establishment is not operated. For example, it is assumed that downloading of moving images is barred in a cell. For a UE in idle mode, even if the UE desires to download a moving image, such an operation is barred. On the other hand, the UE may establish a connection with the network for voice communication and start downloading of a moving image after transition to RRC connected mode. In this case, a problem may occur in that barring is not performed in accordance with a desired scenario.

Unlike a wireless communication mode such as WiFi, in a cellular network communication service directly installed and managed by a communication operator, each communication operator intends to provide several users with a communication service with quality of a certain level or more. Particularly, the amount of radio resources used in wireless communication varies depending on a communication frequency width allocated to each operator and the number of eNBs which are installed. Also, quality of a communication service provided by each operator is additionally affected by various factors such as the number of subscribers.

Particularly, it is assumed that a data speed provided by one eNB is X mbps and a data speed of Y mbps per one call is required for one user in a voice call service which is the most basic in a communication service. In this case, maximum simultaneous calls that may be supported by one eNB may be calculated by X/Y. Therefore, if calls are simultaneously performed in one cell as much as X/Y, a new call of another user cannot be performed normally.

In another case, Internet browsing or chatting service will be considered. It is assumed that the number of users who simultaneously use the service in one cell is K and a maximum speed that may be provided in one cell is M. In this case, it may be calculated that a communication service may be provided to each user at a speed of an average M/K mbps. However, there may be a case that should be processed more early in accordance with each user. For example, if a random UE A is a UE of a general user, and a UE B is a UE of a specific user, for example, a police officer, call/Internet data generated the UE B are more important than those of the UE A. Therefore, if the UE A and the UE B simultaneously start to call, a prior call should be configured for the UE B. If data are generated simultaneously, it is preferable that a higher data speed is provided to the UE B. To support this operation, a cellular communication system indicates a UE that can access a network or a parameter that should be used during access attempt before the UE accesses the network.

However, if a UE (hereinafter, remote UE) currently accesses the network through another UE (hereinafter, relay UE), and if the network cannot control traffic of the remote UE, the network cannot perform the above operation (access control/management per UE). For example, it is assumed that a smartphone provides a tethering service. In this case, the smartphone may perform an IP connection by accessing a cellular system through a communication system such as LTE. If the smartphone provides a tethering service to a smart watch by using a hot spot function, the smart watch is connected to the smartphone by using the communication technology such as WiFi. In this case, the eNB or the network such as EPC cannot control access caused by the smart watch. Therefore, even though an important urgency call is generated in the smart watch, or the smart watch generates data of a low priority, for example, a message such as "keep alive", the network cannot identify the two scenarios from each other. Also, a problem occurs in that Quality of Service (QoS) suitable for each status is not provided considering priority of various data generated between the above smartphone and another smartphone.

In other words, if the remote UE accesses the network through the relay UE, the following problems may occur:

if the network fails to perform an access control of the remote UE, data of a low priority of the remote UE are transmitted to the network as they are without being filtered, whereby congestion of the network is not controlled; or although the remote UE has already performed the access control check, the relay UE which has received data from the remote UE might perform the access control check once more. That is, a non-remote UE performs the access control check only once, whereas the remote UE performs the access control check twice, whereby a network access occasion of the remote UE is lower than that of the non-remote UE.

Therefore, the present invention intends to suggest a method for providing a proper wireless communication service to each UE by effectively controlling a network access of the remote UE and the relay UE when the remote UE receives a network service such as a PDN connection through the relay UE.

Conventionally, for data transfer of the remote UE, only the relay UE has performed an access control check. In the legacy system, the network could not identify whether the UE accessing thereto is the relay UE, and whether there is(are) the remote UE(s) connected to the relay UE, and could not identify the number or state of remote UEs if there is(are) the remote UE(s). Also, the network could not identify a connection request transferred from the relay UE to the network or whether the data are those of the relay UE or the remote, whereby a congestion control could not be performed normally when a congestion status is generated. According to the present invention which will be described later, an access control check performed when the remote UE needs to access the network through the relay UE, that is, an access control check for data transmission of the remote UE may also be performed by the remote UE.

Access Control by Remote UE

If data to be transmitted in uplink are generated, the remote UE first checks whether to transmit the data to the relay UE or request the relay UE of data relay before transferring the data to the relay UE. The remote UE may request the relay UE of data transmission only if allowed.

If data to be transmitted in uplink are generated, the remote UE determines whether to request the relay UE of the data transfer or transmit the data to the relay UE in accordance with access control information provided by system information block (SIB) which is broadcast in a cell on which the remote UE camps.

Access control information provided by SIB may include the followings:

information as to whether data transmission of a certain application has been allowed or barred;

information as to whether data transmission of a certain application category has been allowed or barred;

information as to whether data transmission of a certain service has been barred;

information as to whether data transmission of a certain IMS service, for example, MMTEL, MMVoice service has been allowed or barred;

information on whether data transmission of a UE which belongs to a certain access class (AC) has been allowed or barred;

service specific access control (SSAC) information;

paging priority access control (PPAC) information;

access class barring (ACB) information;

application specific congestion control (ACDC) information;

access control information having a purpose similar to the above cases;

other information (e.g., barring time, barring factor, etc.) transferred together with the control information; and/or access information on a low priority UE.

The remote UE which has received access control information through SIB determines whether transmission of the generated data has been allowed or barred in accordance with the access control information. If transmission of the generated data has been allowed, the remote UE requests the relay UE of transfer of the data or transmits the data to the relay UE.

For example, if ACB information is transmitted through SIB, the remote UE may determine whether its access has been allowed in accordance with a procedure according to ACB by using its AC. For another example, if ACDC is transmitted through SIB, the remote UE may determine an application or application category to which the generated data correspond, and may determine whether its access has been allowed by using ACDC control information according to the determined result.

If access is not allowed, the remote UE may again perform checking whether to allow an access after a certain time in accordance with each procedure (for example, scheme designed in ACB or ACDC).

As described above, if an access control focused on the remote UE is performed, the remote UE performs the access control check, and if the remote UE requests the relay UE to request data transfer or transmit the data to prevent the relay UE which relays the remoted UE from performing the access control check once more, the remote UE may additionally transfer the following information together with the data:

for example, information as to whether the remote UE has checked whether an access is allowed in accordance with the access control information transmitted through SIB; and/or information on the result.

If the remote UE directly checks whether an access is allowed and then transfers data to the relay UE only when the access is allowed, the relay UE receives a transfer request of data from the remote UE or if data required to be transferred to the network are received, the relay UE immediately transfers the data to the network without checking whether to allow an access. That is, if the remote UE performs an access control check, the relay UE may not perform the access control check. For example, if the remote UE performs the access control check and an access attempt of the remote UE is allowed, the relay UE may transmit a connection request to the network without performing the access control check.

The present invention may be restricted such that the relay UE transfers data from the remote UE to the network without performing the access control check only if the remote UE has directly checked whether to allow the access and indicates that the access has been allowed. That is, the relay UE may omit a check whether to allow the access for the data of the remote UE only if the remote UE itself has checked whether the access is allowed and it is determined that the access has been allowed.

The advantages when the remote UE performs the access control are as follows. First of all, if a plurality of remote UEs access one relay UE and the relay UE performs the access control check instead of each remote UE, a processing load of the relay UE is enhanced. Therefore, in this case, if the relay UE performs an access control check for data transfer of the remote UE(s), power consumption of each remote UE is reduced, whereas a side effect occurs in that power consumption of the relay UE is increased. On the contrary, if the remote UE performs the access control, balance of power consumption may be made uniformly. Also, in order that the relay UE performs the access control check instead of the remote UE, much information of the remote UE should be transferred to the relay UE. For example, transfer of sensitive information on an application which has generated data or access class information of the remote UE may act as a weak point in view of security of the remote UE. Also, when the information is transferred from the remote UE to the relay UE, consumption of a radio resource for transferring this information is required. That is, if the relay UE performs the access control check for data transmission/reception of the remote UE, the access control check is caused by data transmission/reception generated in the application, and for data transmission/reception, control related information should separately be transferred to the relay UE, whereby resource overhead is generated.

Access Control by Relay UE

If the remote UE itself has not checked whether access is allowed or if there is no information on access, the relay UE performs a check for access grant, that is, access control check for data transferred from the remote UE. The relay UE controls transmission of data of the remote UE to the network in accordance with the result of the access control check.

Figure 14:
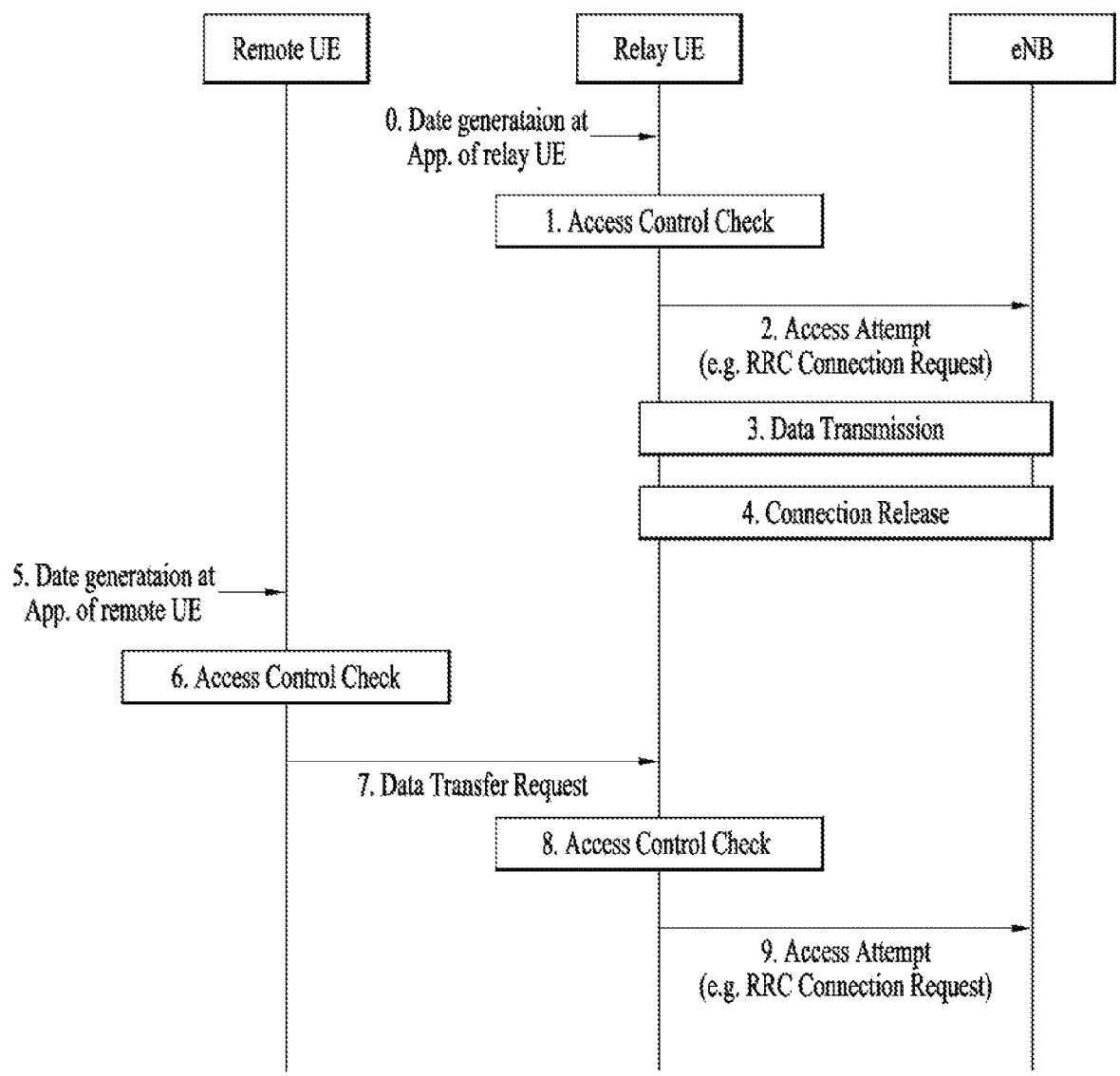
FIG. 14 illustrates an access control procedure according to the present invention.

FIG. 14 illustrates an access control procedure according to the present invention.

If the remote UE performs an access control for itself and as a result attempts an access to the network, the remote UE may request the relay UE of an access. Since the access control check has been performed by the remote UE, the relay UE may omit the access control check for the remote UE.

0. Data are generated from applications installed in the relay UE.
1. The relay UE checks whether it may attempt to access the network by using its information, for example, its access class value.
2. If the relay UE determines in step 1 that an attempt to access the network is allowed, the relay UE actually performs an access procedure for accessing the eNB. For example, the relay UE transmits an RRC connection request message to the eNB to establish an RRC connection with the eNB.
3. After step 2, if a connection between the eNB and the relay UE is established, transmission/reception of information for the applications of the relay UE occurs.
4. After step 3, if there is no data transmitted and received between the relay UE and the eNB any more, a connection between the eNB and the relay UE is released.
5. Data are generated from applications of the remote UE.
6. The remote UE performs an access control for itself. In other words, the remote UE which desires to transfer the data to the network through the relay UE of an idle state having no connection established with the network perform the access control for itself
7. If the access control check passes as a result of the step 6, the remote UE requests the relay UE of connection establishment or data transmission.

In other words, if it is determined that the remote UE accesses the network as a result of the access control by the remote UE, the remote UE requests the relay UE of connection establishment with the network or transfers data, which are intended to be transmitted, to the relay UE. When the remote UE requests the relay UE of connection establishment with the network or transfers its data to the relay UE, the remote UE notifies the relay UE that the remote UE has performed access control check. However, as a result of the step 6, that is, as a result of the access control check performed by the remote UE, if access to the network is barred, the remote UE does not request the relay UE of connection establishment or data transfer. Therefore, in another implementation method, if the remote UE always performs the access control check, the relay UE may recognize that the remote UE has successfully passed the access control check, from the fact that the remote UE requests the relay UE of connection establishment or data transfer.

8. If the relay UE receives a connection establishment request or data transmission request from the remote UE in the step 7, the relay UE determines whether to additionally perform the access control check, in accordance with the whether the remote UE has performed access control check. If the remote UE has performed the access control check and as a result of the check, notifies the relay UE that the access may be allowed, the relay UE omits additional access control check. Alternatively, as mentioned in the step 6, if the connection establishment request or data transfer request is received from the remote UE, the relay UE may indirectly recognize that the remote UE has successfully passed the access control check.

If the remote UE has not performed the access control check or notifies the relay UE that the remote UE has performed the access control check but failed in the access control check, the relay UE may check whether to actually access the eNB by performing the access control check for itself once more.

9. As a result of the step 8, if the relay UE does not need to (additionally) perform the access control check, the relay UE attempts or performs access to the network by transmitting a message such as an RRC connection request.

In order to make the relay UE perform access control to transfer data to the remote UE, the remote UE provides the relay UE with information (hereinafter, access control related information) on an application for the data, an application category or IMS or MMTEL/MMVoice or AC of the remote UE when transferring data. In other words, in order to make the relay UE of the idle state perform an access control check for transition to the connected mode for data transfer to the remote UE, the remote UE may provide its access control related information. The relay UE checks whether an access to a cell is allowed based on the access control related information transferred from the remote UE, and performs an RRC connection procedure (see FIG. 7) if the access is allowed as a result of the check. If the relay UE performs the access control check for data transfer of the remote UE, the relay UE determines whether to access to the network by using the access class information, which is transferred from the remote UE, not its own access class.

The relay UE requested from the remote UE to transfer the data to the network may omit the check if the relay UE has established an RRC connection by already establishing a connection with the eNB. In this case, the relay UE immediately transfers the data received from the remote UE to the network. In other words, if the relay UE is already in the connected mode, access control for the remote UE is omitted.

The communication through a relay UE is not always available whenever a remote UE desires it but the communication standard document may define such that the communication through a relay UE is strictly controlled by the network. If the network commands the remote UE to perform communication through the relay UE, the network may indicate which one of the remote UE and the relay UE will perform an access control. In other words, if the remote UE transmits the data generated by the remote UE to the network through the relay UE in accordance with configuration of the network, the network may transfer information as to whether the remote UE or the relay UE will perform the access control check. Therefore, roles of the remote UE and the relay UE in the access control procedure may naturally be defined.

Communication between UEs will be referred to as 'D2D communication'. 'D2D communication' may be implemented using LTE based PC5 interface or WLAN based IEEE802.16. PC5 interface may be used between the remote UE and the relay UE. Alternatively, WLAN based interface may be used. Data transmission/reception may be performed in a manner for designating ProSe or D2D communication, that is, a manner for designating LTE based PC5 communication or WLAN communication.

Data transmission/reception may be performed between the remote UE and the relay UE in a wireless communication mode designated in 802.11, that is, a wireless communication mode designated in WiFi or WLAN.

If the relay UE performs an access control, it is advantageous in that the access control in view of an overall aspect is available when a plurality of remote UEs are connected to the relay UE. For example, if the plurality of remote UEs simultaneously perform access attempt at a certain time, it is effective that the relay UE performs the access control check at one time considering states of all of remote UEs instead of each remote UE's attempting the access control check. If an entity of the access control check is simplified as the relay UE, it is possible to prevent different remote UEs from being arranged at different states. For example, if the relay UE has already established a connection with the eNB, each remote UE may transmit and receive data at any time through the connection configured by the relay UE. However, if individual remote UEs separately perform access control checks, a problem occurs in that a remote UE fails to use the available connection already established between the relay UE and the eNB if the result of the access control check is not allowing access even though the relay UE has the connection with the eNB.

Meanwhile, there may be an advantage when AC of the relay UE is used for an access started in the remote UE. First of all, when AC of the remote UE is low and AC of the relay UE is high, the remote UE has a high probability of successful connection when attempting connection to the eNB through the relay UE rather than directly attempting connection to the eNB. In this case, since a success probability of a call becomes high, QoS is increased in view of a user of the remote UE. However, in this case, the success probability of access is ensured even for a device, such as a smart watch, which may not always ensure access, more than needs, whereby a problem occurs in that a UE which may have a low probability of access is not filtered effectively when a congestion status actually occurs in the network. If the UE which may have a low probability of access is not filtered effectively, a problem occurs in that UEs of which QoS should be ensured, for example, smartphones have a low probability of access. On the other hand, if AC of the remote UE is used for access started from the remote UE, a problem that an access occasion is obtained more easily than that allowed for the remote UE when a priority of the remote UE is low and a priority of the relay UE is high or a problem that an access occasion is obtained with difficulty more than that allowed for the remote UE when the priority of the remote UE is high and the priority of the relay UE is low may be avoided.

Figure 15:
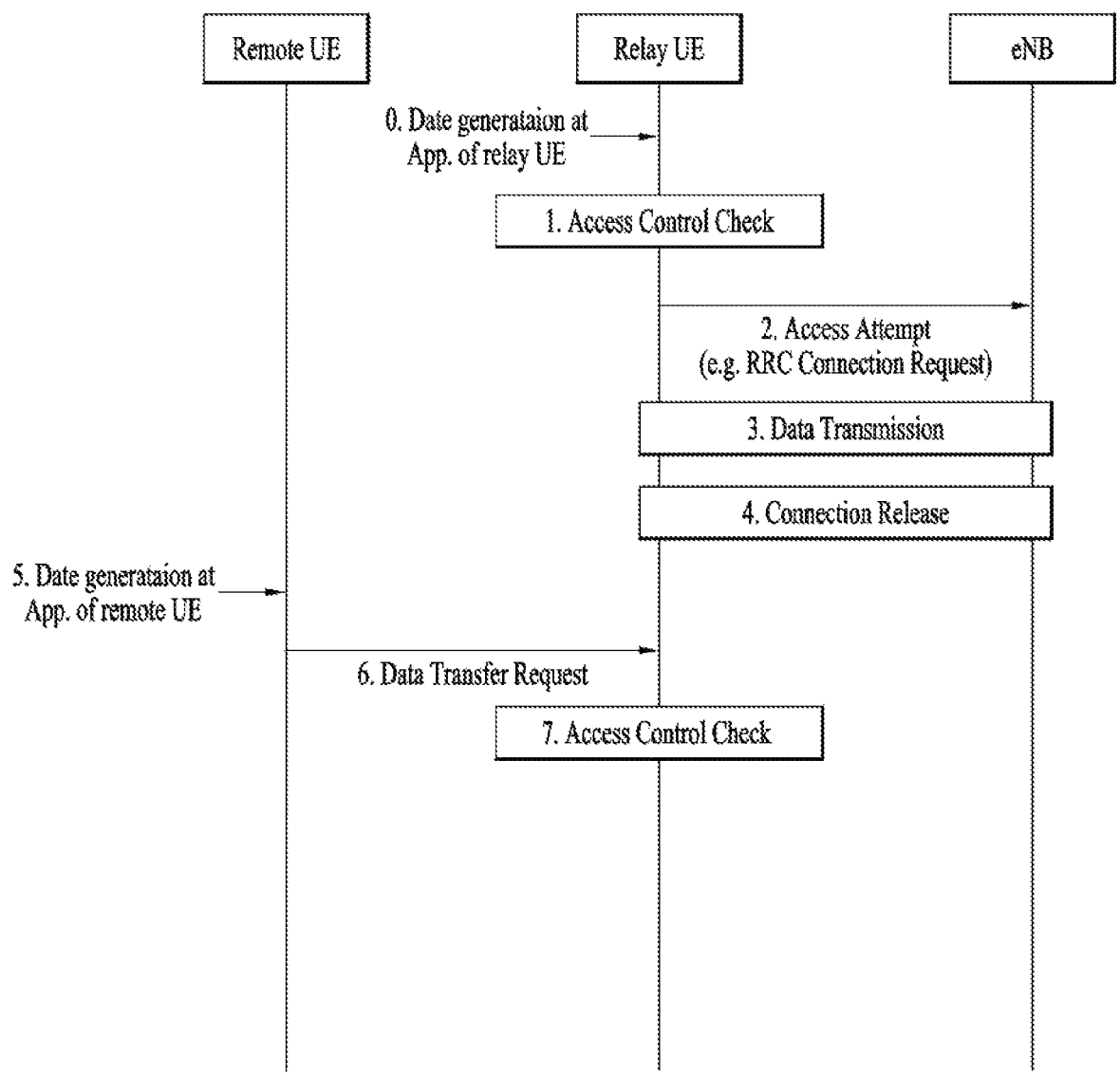
FIG. 15 illustrates another example of an access control procedure according to the present invention.

FIG. 15 illustrates another example of an access control procedure according to the present invention.

If the remote UE has not performed an access control check for itself, the relay UE may perform the access control for data transmission due to the remote UE by using information of the remote UE, for example, access class information.

0. Data are generated from applications installed in the relay UE.
1. The relay UE checks, by using its information, for example, its access class value, whether an access attempt to the network is allowed.
2. If the relay UE determines in step 1 that an access attempt to the network is allowed, the relay UE actually performs an access procedure for the eNB. For example, the relay UE transmits an RRC connection request message to the eNB to establish an RRC connection with the eNB.
3. After step 2, if a connection between the eNB and the relay UE is established, transmission/reception of information for the applications of the relay UE occurs.
4. After step 3, if there is no data transmitted and received between the relay UE and the eNB any more, a connection between the eNB and the relay UE is released.
5. Data are generated from applications of the remote UE.
6. If the remote UE does not perform the access control for itself, the remote UE requests the relay UE of access to the network or data transmission. At this time, the remote UE notifies the relay UE that the remote UE has not performed the access control for itself. Alternatively, if the remote UE does not provide the relay UE with information indicating that the remote UE has performed the access control for itself, the relay UE regards that the remote UE has not performed the access control check. When the remote UE requests the relay UE of access to the network or data transmission to the relay UE, the remote UE transfers its access control related information to the relay UE. For example, the remote UE transfers its access class information to the relay UE.
7. If the relay UE is requested from the remote UE data transmission or access at the step 6 and does not receive information indicating that the remote UE has performed the access control check for itself, the relay UE instead of the remote UE performs the access control check. At this time, since the access to the network is the access for the remote UE not the access by the need of the relay UE or data generated from the application of the relay UE, the relay UE performs the access control check by using information of the remote UE, for example, access class information.

Figure 16:
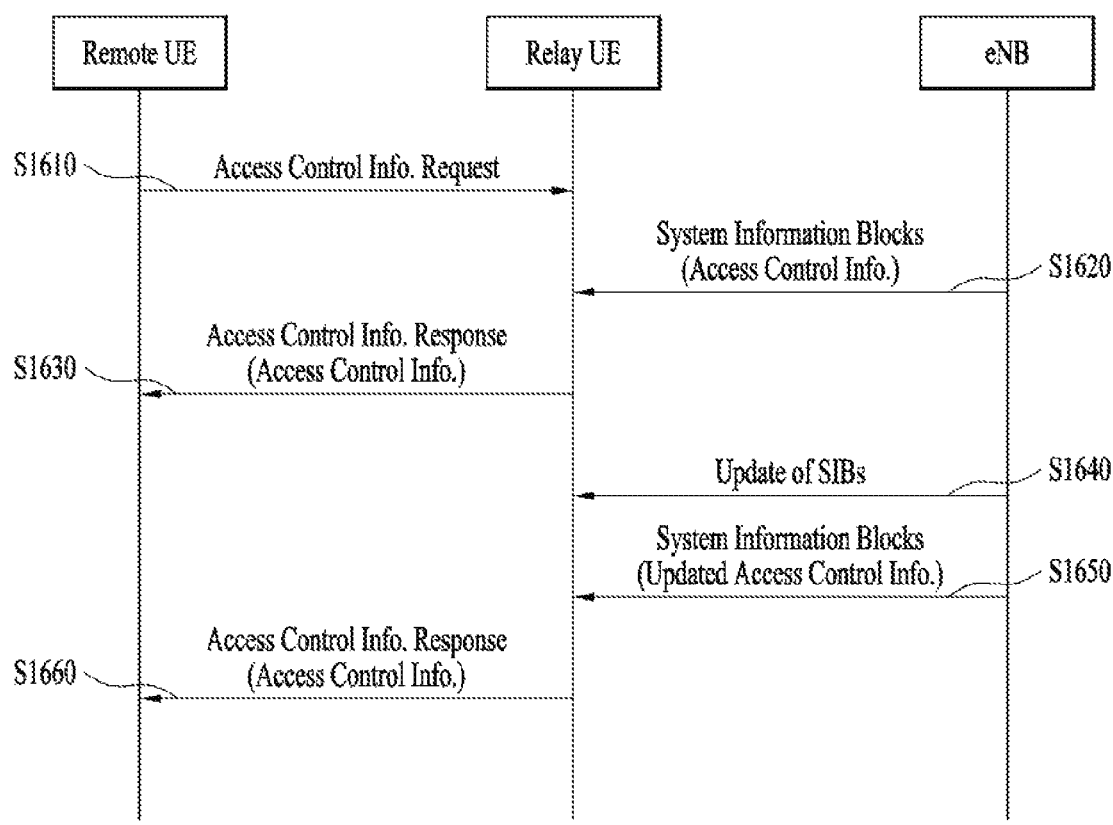
FIG. 16 illustrates a method for obtaining system information in a remote UE in accordance with the present invention.

FIG. 16 illustrates a method for obtaining system information in a remote UE in accordance with the present invention.

There may be a case that the remote UE cannot acquire SIB, that is, system information directly. For example, there may be a case that the remote UE is located outside a cell or SIB is not read for battery saving. In this way, the present invention suggests that the remote UE should request the relay UE of SIB information to acquire access control information when the remote UE cannot acquire access control information directly (S1610). For example, if the remote UE cannot perform access to a cell or reception of SIB information transmitted from the cell and communication with the relay UE at the same time, the remote UE may inform the relay UE of this fact (S1610). The relay UE may transfer the access control information (S1620) received from the cell to the remote UE (S1630). In this case, the remote UE may perform the access control for itself as described above in accordance with the access control information transferred from the relay UE (see FIG. 14).

If the relay UE is in a communication range of the remote UE regardless of the fact that the remote UE is out of coverage or in coverage, the remote UE should receive a service by accessing a 3GPP network through the relay UE. Therefore, in the aforementioned suggestions of the present invention, although the remote UE has determined whether to access the network by directly receiving the SIB from the eNB, the remote UE should control the access to the network even without directly receiving the SIB from the eNB. To this end, the present invention suggests that the relay UE should transfer access control related information (ACB, ACDC, SSAC, EAB, etc.) to the remote UE to control the access of the remote UE to the network. Particularly, access control information transmitted from each cell by the eNB may be changed dynamically in accordance with cell load (S1640). Whenever the access control related information is updated in the cell (S1640), the relay UE may receive the updated access control related information (S1650) and transfer the updated access control related information to the remote UE (S1660).

As another method, if the remote UE has data to be transmitted to the network and also has the connection context with the relay UE, the remote UE may additionally request the relay UE to transfer the latest access control related information (S1610). If the access control related information is requested from the remote UE (S1610), the relay UE may transfer the latest access control information received through SIB from the eNB (S1620) to the remote UE (S1630). If the access control related information is requested from the remote UE (S1610), the relay UE may newly receive access control information from the eNB through SIB (S1650) and transfer the access control information to the remote UE (S1660).

When providing SIB information to the remote UE, the relay UE may provide SIB information per remote UE or may commonly provide SIB information to all the remote UEs. In other words, the relay UE may provide SIB information to the remote UE UE-specifically, or non-UE-specifically, i.e., UE-commonly. If the relay UE provides the access control information to each remote UE, since each remote UE receives only information required for itself, reception of unnecessary information is barred. However, in this case, in order for the relay UE to provide customized information to each remote UE, the relay UE should know information on characteristic and configuration of the remote UE. That is, a problem occurs in that the remote UE should transfer related information to the relay UE to prevent unnecessary information from being transferred from the relay UE to a specific remote UE. Particularly, since the relay UE should transfer information individually even in the case that there are a plurality of remote UE having similar types or characteristics exist, efficiency may be deteriorated.

On the contrary, if the relay UE transmits all kinds of information without considering characteristic per remote UE, a waste of radio resources between the relay UE and the remote UE may be caused. Particularly, in this case, since the relay UE does not know a remote UE existing under its management, that is, in its communication coverage, a problem occurs in that the relay UE unilaterally provides information which is not required by the remote UE in its communication coverage. However, this method has an advantage in that the relay UE does not have to manage a context for each of the remote UEs.

Figure 17:
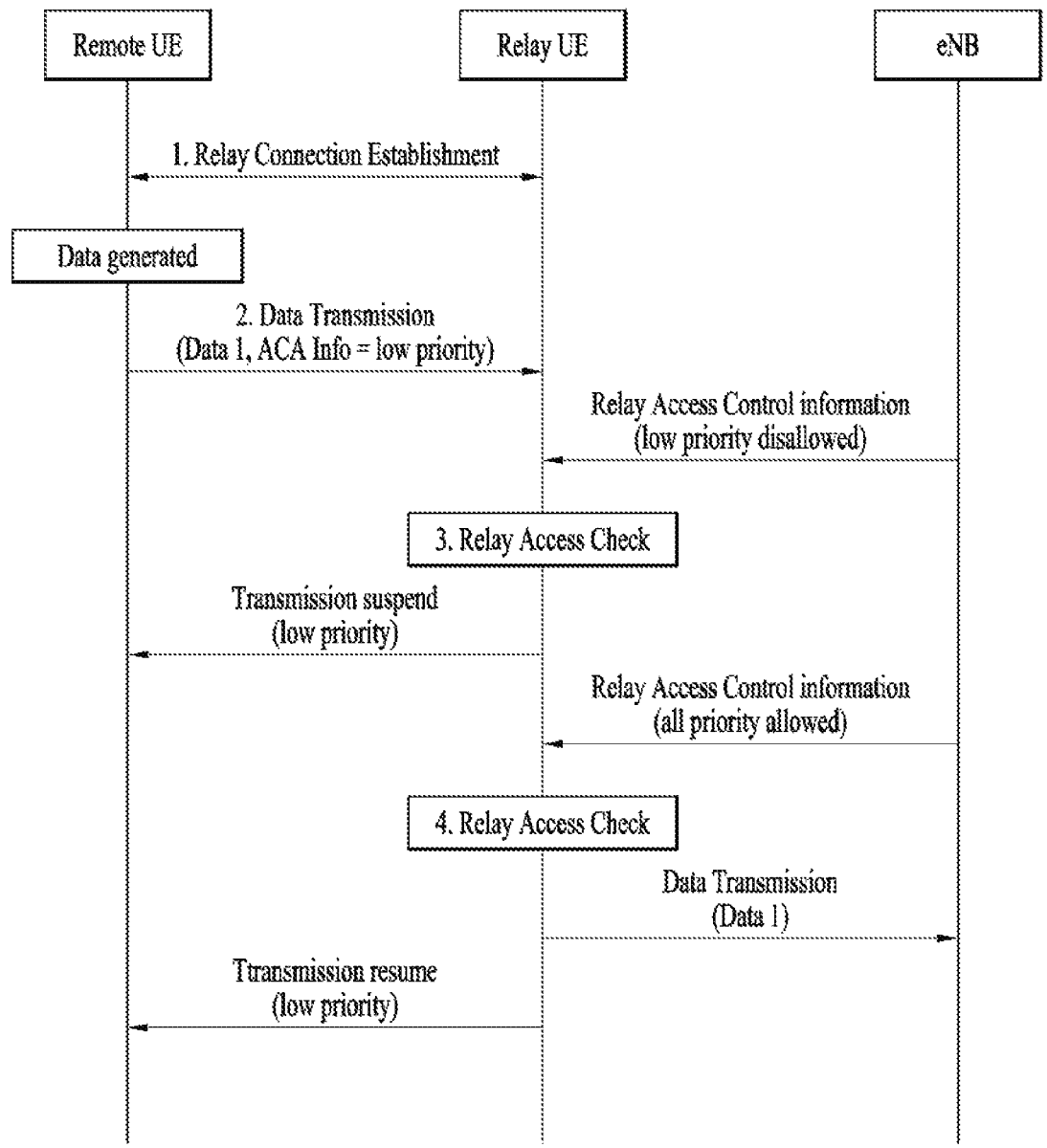
FIG. 17 illustrates another method for obtaining system information in a remote UE in accordance with the present invention.

FIG. 17 illustrates another method for obtaining system information in a remote UE in accordance with the present invention.

To control the access of the relay UE to the eNB due to information transmitted from the remote UE to the relay UE, the eNB may transmit separate access control information applied to only the remote UE through SIB. That is, to solve a problem generated due to access control information applied without differentiating the remote UE and the relay UE, the eNB may transmit information for access control corresponding to only the remote UE. For example, although the remote UE is used as a wearable UE, has a low power, and mainly transmits application data transmitted intermittently, the number of these wearable UEs is absolutely more than the number of general UEs such as smartphones. However, if the eNB does not differentiate remote UEs from smartphones, and if the wearable UEs are increased, access of smartphones is restricted unnecessarily. However, considering that voice calls are mainly handled by smartphones, more accesses should be ensured for the smartphones even though there are a lot of UEs in a cell. Therefore, the eNB may transfer an access control parameter additionally applied to only the remote UE to the relay UE through SIB, and the relay UE may additionally transfer the access control parameter to the remote UE. When the relay UE transfers the data transferred from the remote UE to the eNB, the relay UE may use the access control parameter for the remote UE for additional access control. Alternatively, the remote UE may directly receive SIB having the access control parameter for the remote UE from the cell. For example, referring to FIG. 17, the access control information for the remote UE may be provided through SIB as follows, and may be used by the remote UE or the relay UE.

1. The remote UE and the relay UE establish their relay connection.
2. If data are generated from the remote UE, the remote UE transfers the data to the relay UE, and also transfers access control related information of the data together with the data. In this example, it is assumed that a priority of the data is low.
3. The relay UE checks whether access control has been performed for the data received from the remote UE. For example, the eNB transmits access control information for the remote UE, and the relay UE receives the access control information. If transmission of data having a low priority in the access control information for the remote UE is disallowed ("low priority disallowed"), the relay UE does not transmit the data transferred from the remote UE. In this case, the relay UE transfers access control related information to the remote UE to prevent the remote UE from additionally transmitting data, of which transmission is disallowed, to the relay UE. For example, the relay UE commands the remote UE to suspend transmission of data corresponding to a low priority.

4. The eNB may transmit new access control information for the remote UE.

For example, the new access control information may include information for allowing access of data of all priorities. In this case, the relay UE identifies that transmission of data having a low priority of the remote UE has been allowed by receiving the access control information. Therefore, the relay UE may transmit data transferred from the remote UE to the eNB. Also, if the relay UE has transferred access control related information to the remote UE, the relay UE may transfer new access control related information to the remote UE. That is, if the relay UE has transmitted the previously suspended command to the remote UE, the relay UE may transmit a resume command to the remote UE.

In FIG. 17, it is assumed that the remote UE does not read SIB of the cell. However, for access control of the remote UE, the remote UE may be configured to directly read SIB related to access control from the cell. In this case, the procedure of transferring SIB from the eNB to the remote UE through the relay UE may be omitted from FIG. 17.

If the relay UE centric access control is performed, that is, if the remote UE unconditionally transfers data to the relay UE without performing access control, data may be accumulated in a buffer of the relay UE. In other words, if the remote UE continues to transfer data to the relay UE without performing access control, the relay UE may accumulate data in the buffer without transferring the data to the network. For example, referring to step 4 of FIG. 17, the eNB cannot know when to transmit new access control information. Therefore, if the procedure described in step 3 and step 4 of FIG. 17 is very long, a problem may occur in that data transferred from the remote UE to the relay UE are stored in the relay UE for an unnecessarily long time. Also, if the data stored in the relay UE for an unnecessarily long time are transferred to the eNB through the procedure described in step 4, since data to be deleted from the application are transferred to the eNB, a problem occurs in that radio resources are wasted unnecessarily. To solve this problem, the eNB transfers, to the relay UE, information for controlling how long the data transferred from the remote UE should be stored, in accordance with each data characteristic. Therefore, the relay UE may run a timer if the data are transferred from the remote UE, and may delete the data if the data are not transferred to the eNB until the timer expires. A value corresponding to the timer may be determined in accordance with a logical channel, a priority, etc. The value corresponding to the timer may be transferred from the eNB to the relay UE or from the remote UE to the relay UE.

Although FIG. 17 illustrates that an access and a flow are controlled in accordance with a priority, the access and the flow may be controlled using other information such as logical channel and IP address instead of the priority. For example, the network may command the relay UE to transmit all data corresponding to the remote UE through a specific logical channel. In this case, the network may transmit a command for temporarily suspending/resuming transmission/reception of data through the logical channel to perform access control.

Also, the present invention intends to control a flow of data between the remote UE and the relay UE considering capacity of the relay UE. For example, mass data are generated in the smartphone, which serves as the relay UE, due to video uploading. If mass data are generated in the remote UE (another device) which uses the smartphone as the relay UE, and if the remote UE unilaterally transmits the data, a buffer overflow or memory lack may occur in the relay UE due to the data. Therefore, to solve this problem, the present invention suggests that the relay UE should transmit, to the remote UE, information on the amount of data accumulated in its buffer or information on data which the remote UE may request the relay UE to transmit. This information (hereinafter, buffer control information) transmitted from the relay UE to the remote UE may include the followings:

information as to whether transmission of data belonging to a certain application or application category has been allowed or disallowed;

information as to whether a remote UE belonging to a certain access class is allowed to transmit data or request a transfer of data;

information as to whether data transmission has been allowed or disallowed for each of MMTel/MMVideo or IMS service;

information as to whether transmission of data corresponding to a certain priority has been allowed or disallowed; and/or information as to how much data should newly be transmitted if transmission of data has been allowed.

If the remote UE receives buffer control information from the relay UE, the remote UE may perform data transfer request to the relay UE or data transmission to the relay UE in accordance with the indication of the buffer control information. For example, if the relay UE notifies the remote UE that data corresponding to application categories 1 and 2 have been only allowed, and if the generated data of the remote UE belong to application category 1, the remote UE transmits the corresponding data to the relay UE. On the contrary, if the generated data of the remote UE belong to application category 3, the remote UE does not transmit the corresponding data to the relay UE.

Meanwhile, as another method, the present invention suggests that a type of data that may be transferred from the remote UE through the relay UE should be restricted. When the UE is operated as a non-remote UE, all data may be transmitted to the network. When the UE is operated as a remote UE, the data which may be transferred through the relay UE may be restricted. For example, since additional transmission delay may occur if the data of the UE pass through the relay UE, voice call such as VoLTE may be restricted when the remote UE is connected to the remote UE.

To control a type of data that may be transferred from the remote UE through the relay UE, if the remote UE is connected to the network through the relay UE, the network may transfer information on data, which may be transmitted from the remote UE, to the remote UE. If a remote UE is connected to a core network through a relay UE, the core network may notify the remote UE of data, which may be transmitted through the relay UE, through a NAS message or a RRC message. In this case, the remote UE may transmit only the data allowed by the information to the network through the relay UE in accordance with the information transferred from the network. For example, the network transfers, to the remote UE, information on which type of traffic the remote UE can transmit to the network. This information may be indicated through an IP address, port number, etc. For example, the network may command that the remote UE directly transfer only a traffic having IP of 201.x.x.x and a port number of 2014 thereto and transmit the other traffics, i.e., traffics which do not correspond to IP of 201.x.x.x and a port number of 2014, through the relay UE.

To control a type of data that may be transferred from the remote UE through the relay UE, the network may control the relay UE. That is, the remote UE may transmit the generated data to the relay UE without any check, and the relay UE may select and transfer data to be additionally transferred to the network in accordance with a certain criteria. For example, the network transfers, to the relay UE, information on which traffic the remote UE is allowed to transmit to the network. This information may be indicated through IP address, port number, etc.

Figure 18:
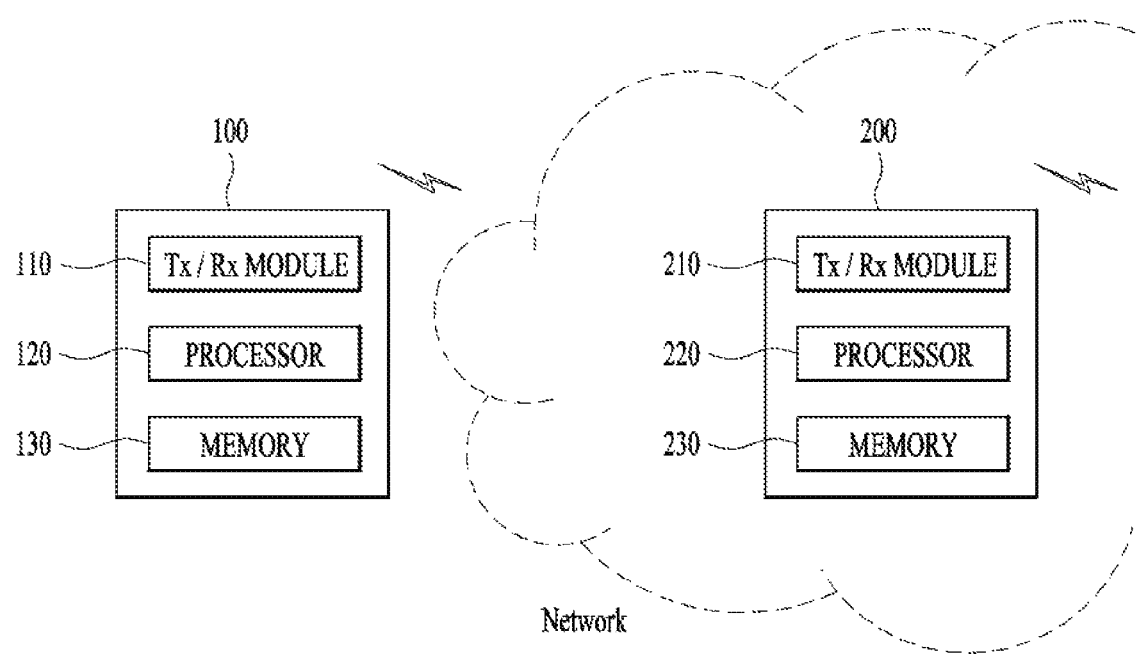
FIG. 18 illustrates a node device applied to the suggestion of the present invention.

Referring to FIG. 18, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method for requesting, by a first UE (User Equipment), a connection to a network in a wireless communication system, the method comprising:
 receiving, from a second UE, at least one of a transfer request for data of the second UE or the data;
 based on receiving information informing that an access control check is performed at the second UE, transmitting a connection request without performing the access control check;
 based on not receiving the information informing that the access control check is performed at the second UE, transmitting the connection request based on an access attempt to the network being allowed, as a result of performing the access control check based on an access class of the second UE; and
 transmitting, to the network, a connection request based on the access attempt to the network being allowed,
 wherein the first UE is located inside a coverage of the network.

2. The method according to claim 1,
 wherein the connection request relates to an RRC (Radio Resource Control) connection request.

3. The method according to claim 1, further comprising:
 based on not receiving the information informing that the access control check is performed at the second UE, receiving, from the second UE, information related to the access class of the second UE.

4. The method according to claim 1, further comprising:
 receiving, from the second UE, information informing whether the access control check is performed at the second UE.

5. The method according to claim 1, further comprising:
 receiving, from the second UE, information informing whether the access attempt to the network is allowed.

6. The method according to claim 1, further comprising:
 based on a connection with the network being established, transferring the data.

7. A first UE (User Equipment) for requesting a connection to a network in a wireless communication system, the first UE comprising:
 a transceiver, and
 a processor that:
 receives, from a second UE, at least one of a transfer request for data of the second UE or the data;
 based on receiving information informing that an access control check is performed at the second UE, cause the transceiver to transmit a connection request without performing the access control check;
 based on not receiving the information informing that the access control check is performed at the second UE, cause the transceiver to transmit the connection request based on an access attempt to the network being allowed, as a result of performing the access control check based on an access class of the second UE; and
 cause the transceiver to transmit, to the network, a connection request based on the access attempt to the network being allowed,
 wherein the first UE is located inside a coverage of the network.

8. The UE according to claim 7,
 wherein the connection request relates to an RRC (Radio Resource Control) connection request.

9. The UE according to claim 7, wherein the processor is further configured to:
  based on not receiving the information informing that the access control check is performed at the second UE, receive information related to the access class of the second UE from the second UE.

10. The UE according to claim 7,
  wherein the processor is further configured to receive information from the second UE informing whether the access control check is performed at the second UE.

11. The UE according to claim 7,
  wherein the processor is further configured to receive further receives information from the second UE informing whether the access attempt to the network is allowed.

12. The UE according to claim 7, wherein the processor is further configured to:
  based on a connection with the network being established, control the transceiver to transfer the data.

13. The method according to claim 1, wherein, in a state in which the first UE receives the information informing that the access control check is performed at the second UE,
  at least one of the transfer request or the data informs whether the access attempt to the network is allowed.

14. The method according to claim 7, wherein, in a state in which the first UE receives the information informing that the access control check is performed at the second UE,
  at least one of the transfer request or the data informs whether the access attempt to the network is allowed.

\* \* \* \* \*